United States Patent [19]

Timperio

[11] 4,195,876
[45] Apr. 1, 1980

[54] GLARE SHIELD ASSEMBLY

[76] Inventor: Henry Timperio, Mayfield Heights, Ohio

[21] Appl. No.: 925,945

[22] Filed: Jul. 19, 1978

[51] Int. Cl.² .............................................. B60J 3/02
[52] U.S. Cl. ................................ 296/97 G; 296/97 K
[58] Field of Search ................. 296/97 R, 97 B, 97 C, 296/97 D, 97 F, 97 G, 97 H, 97 K; 248/316 R, 316 A, 448, 451, 225.3, 226.1

[56] References Cited

U.S. PATENT DOCUMENTS

| 2,070,208 | 2/1937 | Kelly | 206/97 G |
|---|---|---|---|
| 2,212,007 | 8/1940 | Buchanan | 296/97 C |
| 2,501,176 | 3/1950 | Jacobs | 248/316 A |
| 2,542,409 | 2/1951 | Guenther | 296/97 C |
| 2,829,919 | 4/1958 | Bartlett | 296/97 C |
| 2,831,726 | 4/1958 | Ralston | 296/97 C |
| 2,842,395 | 7/1958 | Davis | 296/97 C |
| 3,201,170 | 8/1965 | Weingarten | 296/97 C |
| 3,445,135 | 5/1969 | Masi | 296/97 C |

FOREIGN PATENT DOCUMENTS 2313226  12/1976  France ................................. 296/97 H Primary Examiner—Robert R. Song
Assistant Examiner—John A. Carroll

[57] ABSTRACT

A glare shield assembly 20 (FIG. 2) for attachment to a motor vehicle sun visor 27 is pivotably mounted for rotation about a generally horizontal axis proximate a major edge 46 of the visor. The glare shield assembly 20 includes first 30 and second 32 longitudinally extending clips for engaging the major edges 45 and 46 of the visor 27 to connect the glare shield assembly 20 with the sun visor. First, second, and third glare shields 22, 24, and 26 for reducing the glare of light directed toward the eyes of the driver of the motor vehicle are pivotally connected with the clips by hinges.

14 Claims, 10 Drawing Figures

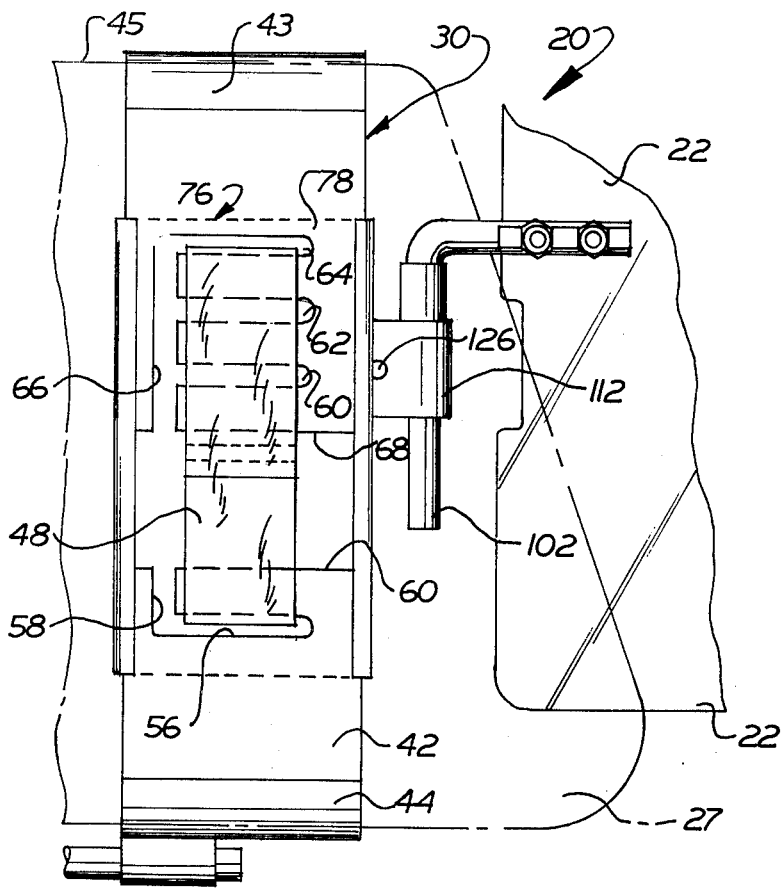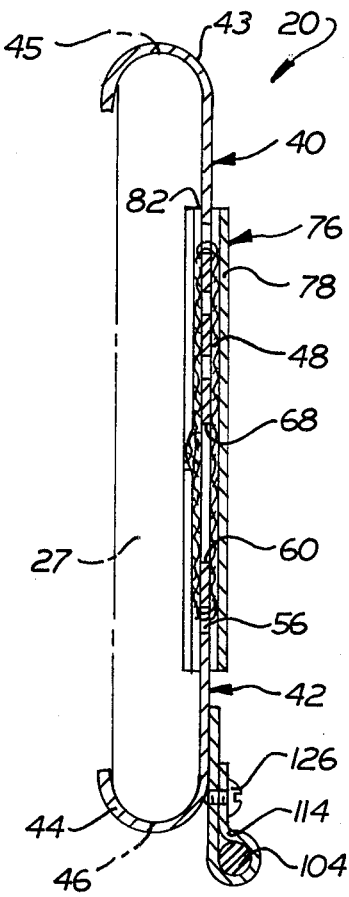
FIG. 6　　　　　　　　　FIG. 7
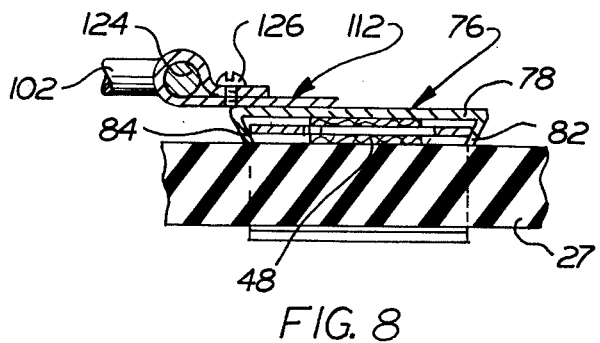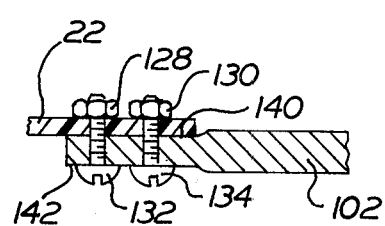
FIG. 8　　　　　　　　　FIG. 9
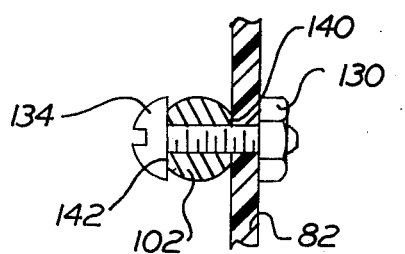
FIG. 10

GLARE SHIELD ASSEMBLY

BACKGROUND OF THE INVENTION

This invention relates generally to an improved glare shield assembly which is able to shield the operator of a motor vehicle from the glare of the sun or the head lights of oncoming vehicles.

There are known glare shield arrangements which are attached to sun visors with various types of clips. Some U.S. Pat. Nos. disclosing glare shield arrangements are 2,542,409; 2,829,919; 2,831,726; and 3,445,135.

Further there have been attachments to sun visors which provide additional shields to block glare from several directions simultaneously. Some U.S. patents which disclose visor attachments with more than one glare shield are U.S. Pat. Nos. 2,829,919; 2,831,726; and 3,201,170.

SUMMARY OF THE INVENTION

The present invention provides a new and improved glare shield assembly which is capable of reducing glare whether the glare is produced by sunlight or by oncoming or following vehicles. A center shield pivots down to a position below a sun visor to which it is attached. In this position the center shield will block glare of sun or headlights of oncoming vehicles shining through the windshield. A side shield is pivoted at the left side of the driver's sun visor. When the side shield is extended it blocks glare coming in from the driver's side window and particularly light reflected from an outside rear view mirror. A second side shield is pivoted at the right side of the driver's sun visor. When the second side shield is folded out, it blocks glare which would otherwise be reflected off the inside rearview mirror into the driver's eyes.

When not needed, each of the three shields may be folded flat against the visor. Any one or all of the shields may be folded to this inactive position in which they do not interfere with the normal function of the visor.

The invention also provides a pair of improved clamps for holding the shields on the sun visor. Each clamp includes hinge straps for engaging hinge pins connected to the side and lower shields. Each clamp is composed of a pair of hooks which engage the top and bottom edges of the visor. An elastic strap pulls the hooks toward each other and into tight engagement with the edges of the visor. A guide member aligns the two hooks with one another.

Accordingly, it is an object of this invention to provide a new and improved glare shield assembly which can block glare which would otherwise reach the driver's eyes from the sun or oncoming traffic and from glare reflected in the inside and outside rearview mirrors.

It is a further object of this invention to provide a new and improved glare shield assembly connected with a pair of opposed hooks urged into engagement with opposite edges of an automobile sun visor by an elastic strap and kept in alignment with each other by a guide member.

It is a further object of this invention to provide a new and improved glare shield assembly having three glare shields pivotally connected with the sun visor of an automobile, each shield can be moved about its pivot axis between an active position between the source of glare and the driver's eyes and an inactive position in juxtaposition with the visor.

BRIEF DESCRIPTION OF THE DRAWINGS

The foregoing and other objects and features of the present invention will become more apparent from a reading of the accompanying specification taken together with the accompanying drawings in which:

FIG. 6 is a rear elevational view of the clip of FIG. 5 and illustrating an elastic strap and a plurality of slots for varying the tension in the strap;

FIG. 7 is a sectional view taken along line 7—7 of FIG. 5 and further illustrating the construction of the clip;

FIG. 8 is a sectional view taken along line 8—8 of FIG. 5 and illustrating the construction of a pivot connection which attaches a side shield to the clip;

FIG. 9 is a sectional view taken along line 9—9 of FIG. 5 and illustrating a connection between the side shield and a pivotal support arm; and FIG. 10 is a sectional view taken along line 10—10 of FIG. 5.

DESCRIPTION OF ONE PREFERRED EMBODIMENT

Figure 1:
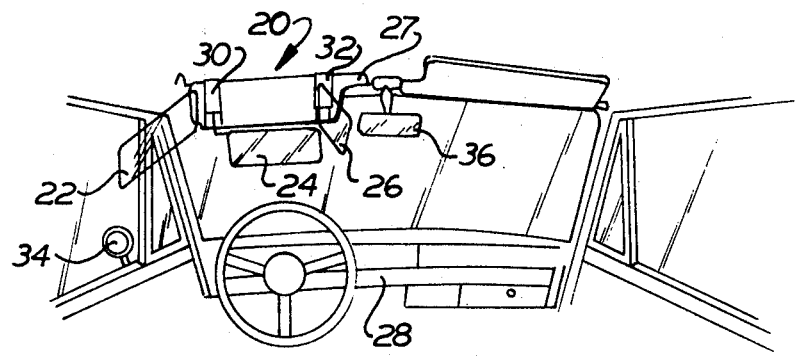
FIG. 1 is an illustration of the glare shield assembly of the present invention shown in its fully open position and attached to a sun visor in an automobile.

A glare shield assembly 20 (FIG. 1) constructed in accordance with the present invention includes three glare shields 22, 24, and 26 which are attached to the sun visor 27 of an automobile 28 by clips 30 and 32. The glare shields 22, 24, and 26 (FIG. 1) are formed from a colored semi-transparent plastic material, such as is used to make sunglasses. The material transmits a portion of the incident light without distortion, the balance of the incident light is absorbed or reflected. The result is that a driver of a vehicle 28 may see clearly when looking through the glare shields 22, 24, and 26 even in bright sunlight, or at night when the lights of oncoming cars shine at the driver.

The three shields 22, 24, and 26 are pivotally connected to the clips 30 and 32. This enables the glare shields 22, 24, an 26 to be pivoted relative to the visor between active positions (FIGS. 1 and 2) when glare is a problem and inactive positions (FIG. 4) when they are not needed.

Figure 2:
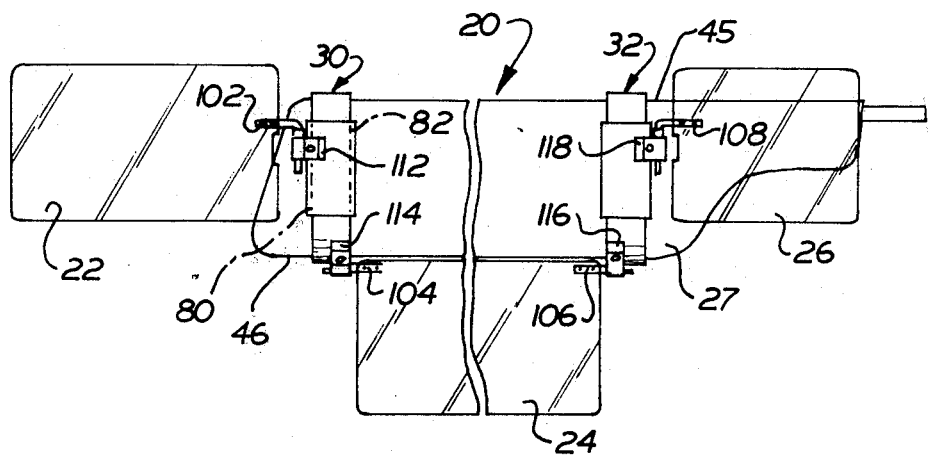
FIG. 2 is an enlarged illustration similar to FIG. 1 showing only the visor and glare shield assembly with three glare shields in a fully open position.
Figure 3:
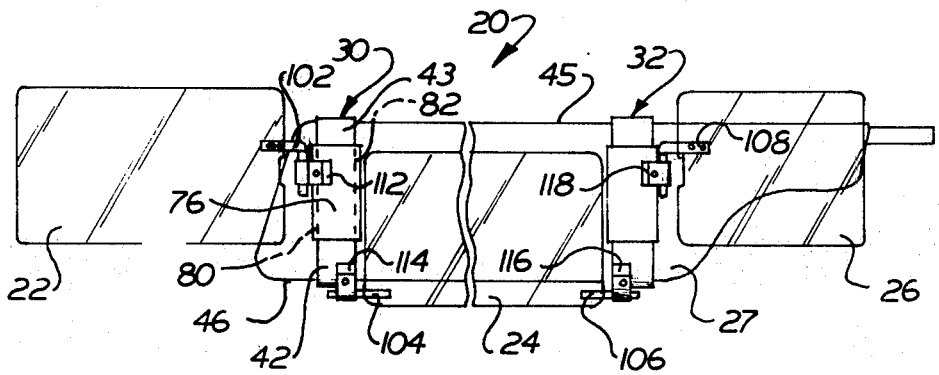
FIG. 3 is an illustration similar to FIG. 2 but showing the glare shield assembly with its center shield in an inactive position and the side shields in open positions.

The lefthand shield 22 (as viewed in FIGS. 1–4) may be moved to an active position where it intercepts light reflected off the outside rearview mirror 34. The lefthand shield 22 is shown in this position in FIG. 1. The center shield 24 may be moved to an active position where it intercepts light from oncoming traffic or harsh sunlight (FIGS. 1 and 2). The righthand shield 26 may be moved to an active position where it intercepts light reflected from the inside rearview mirror 36 (FIGS. 1–3).

Figure 4:
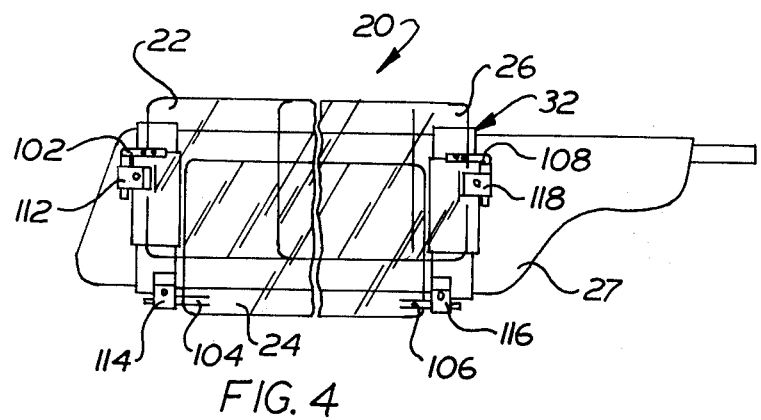
FIG. 4 is an illustration similar to FIG. 3 but showing the glare shield assembly in an inactive position.

When not required to block glare, each of the shields 22, 24, and 26 may be moved to an inactive position folded out of the way against the sun visor (see FIG. 4). When the shields 22, 24, and 26 are in the inactive position (FIG. 4) they are disposed in close juxtaposition with the upper or inner side of the sun visor 27. This enables the visor 27 to be pivoted upwardly to a retracted position adjacent to the roof of the vehicle 28.

The glare shields 22, 24, and 26 are pivotally mounted on the sun visor by the clips 30 and 32. The clips 30 and 32 are substantially identical. Consequently, only the clip 30 will be described in detail, and it will be understood that this description applies as well to clip 32.

Figure 5:
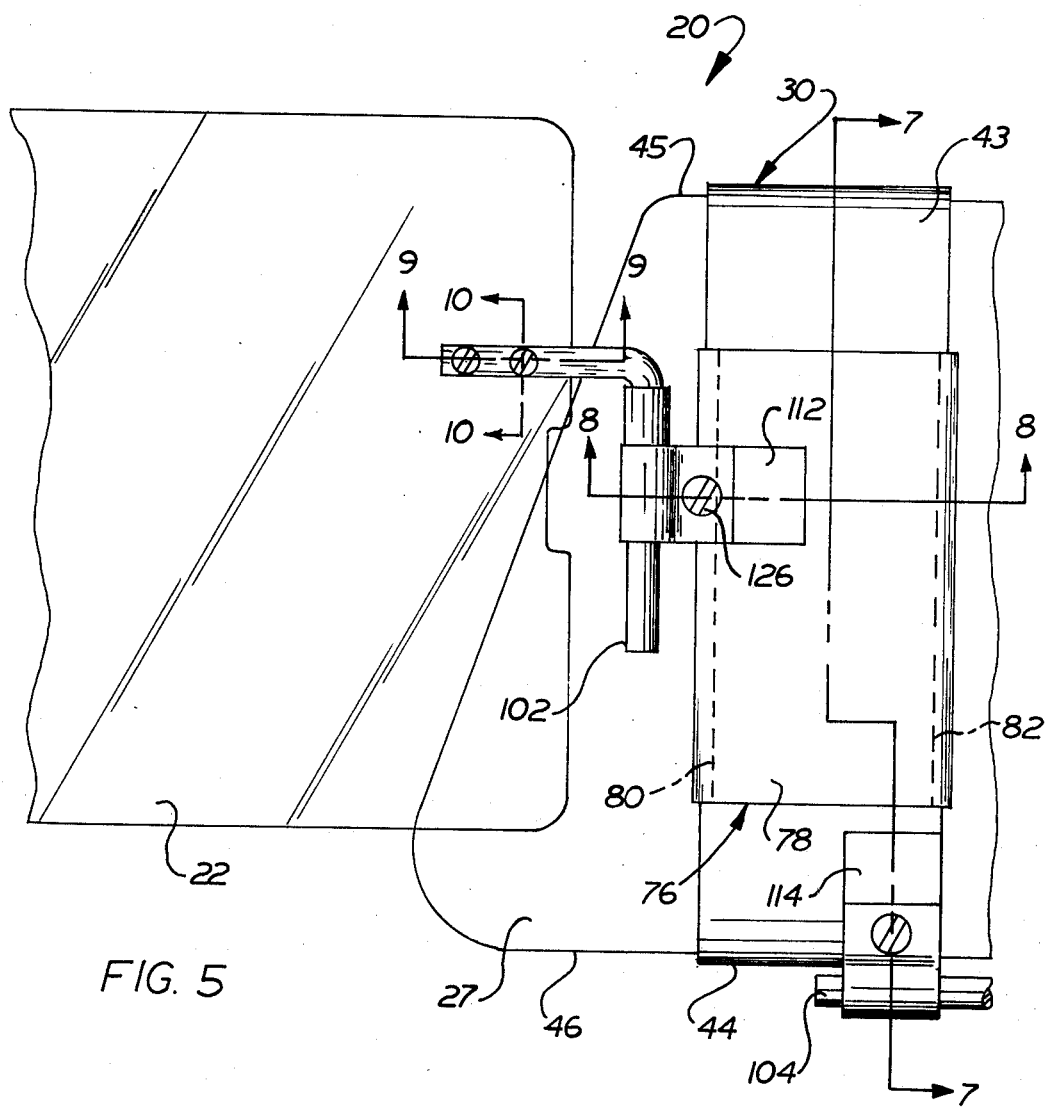
FIG. 5 is an enlarged front elevational view of a clip used to connect the glare shield assembly to a sun visor.

The clip 30 engages the upper and lower edges of the sun visor 27 (FIGS. 5-7). The clip 30 includes a pair of opposing C-shaped hooks 40 and 42 which engage the parallel major edges 45 and 46 of the visor 27. Each of the hooks 40 and 42 is formed from a flat piece of sheet metal with a curved end portion 43 and 44 (FIG. 7). The radius of curvature of the curved end portions 43 and 44 of the hooks 40 and 42 is sufficiently large to enable the clip 30 to engage even a relatively thick sun visor 27.

An elastic strap 48 (FIGS. 6 and 7) engages the hooks 40 and 42 and draws them toward each other. This elastic strap 48 draws the hooks 40 and 42 together to firmly engage the visor 27. Yet when it is desired to attach or remove the clip 30 from the visor 27, the elastic strap 48 provides sufficient resilience to allow the hooks 40 and 42 to be disengaged from the visor.

The hook 42 is provided with a slot 56 (FIG. 6) to engage the elastic strap 48. The slot 56 extends generally parallel to the major edges 45 and 46 of the sun visor 27. An access slot 58 intersects slot 56 and the edge 60 of the clip 42. The access slot 58 makes it possible to insert the elastic strap 48 into the slot 56.

The hook 40 is similar to hook 42 except that it is provided with three parallel slots 60, 62, and 64 (FIG. 6). An access slot 66 connects the slots 60, 62, and 64 with the edge 68 of the hook 40. By moving the strap 48 from the position shown in slot 64 through the access slot 66 to either of the other slots 62 or 60 it is possible to adjust the distance between the curved portions 43 and 44 of the hooks 40 and 42. This enables the glare shield assembly to be attached to sunvisors of different widths.

The hooks 40 and 42 are maintained in alignment with one another by a guide 76 (FIGS. 5 and 6). The guide 76 is formed from a rectangular piece of metal. The guide 76 includes a flat base 78 and two parallel, inwardly sloping sides 80 and 82. The sides 80 and 82 engage opposite edges of the hooks 40 and 42 to hold them in parallel alignment. Once the hooks 40 and 42 have been inserted in the guide 76, they are engaged by the inward slope of the sides 80 and 82. This permits the hooks 80 and 82 to move only parallel to the plane of the base 78 in a direction parallel to the sides 80 and 82 of the guide 76 and prevents sidewise movement of the hooks relative to each other.

The glare shields 22, 24, and 26 are pivotally connected with the clips 30 and 32. To this end each shield 22, 24, and 26 (FIG. 2) has connected with it a hinge pin or hinge pins 102, 104, 106, and 108. These are engaged by associated hinge straps 112, 114, 116, and 118 connected with a clip 30 or 32. All of the hinge pins 102, 104, 106, and 108 are made from a cylindrical metal rod and differ only in that the hinge pins 102 and 108 associated with the left and right shields 22 and 26 are bent so that one portion forms a 90° angle with the other portion. This enables the shields 22 and 26 to fold about axes which extend perpendicular to the major side edges 45 and 46 of the sun visor 27. With these variations in mind only the hinge pin 102 will be described. In addition, except for the location of each hinge strap 112, 114, 116, and 118 on the clips 30 and 32 the hinge straps are substantially identical. Consequently, only the hinge strap 112 will be described, but it will be understood that the description applies as well to the remaining hinge straps 114, 116, and 118.

The hinge strap 112 (FIGS. 5 and 8) is formed from a flat piece of sheet metal which is wrapped around the hinge pin 102 to provide a generally cylindrical passage 124 (FIG. 8). The cylindrical passage 124 receives the hinge pin 102 and enables it to rotate about the central axis of the passage.

The interior surface of the passage 124 is brought into tight engagement with the pin 104 by a screw 126. By tightening or loosening the screw 126 the grip of the hinge strap 112 on the hinge pin 102 may be likewise tightened or loosened. This enables the attached shield 22 (FIGS. 2 and 5) to remain in whatever position it is placed.

The hinge pin 102 is connected with the shield 22 (FIGS. 9 and 10) by any suitable means such as nuts 128 and 130 in cooperation with bolts 132 and 134. The hinge pin 102 has two parallel flat surfaces 140 and 142 which provide enlarged areas of contact between the bolt 134, the hinge pin 102, and the shield 22. The surface 142 is disposed in flat abutting engagement with the head end of the bolts 132 and 134. The surface 140 is disposed in flat abutting engagement with the shield 22. The flat contact surfaces 140 and 142 enable a firm connection between the shield 22 and the hinge pin 102.

The hinge straps 114 and 116 (FIGS. 2, 3, and 4) are mounted to clips 30 and 32 to enable the shield 24 to be pivoted about an axis disposed in close proximity to and parallel to the lower edge 46 of the visor 27. The hinge strap 114 is connected with the lower hook 42 of the clip 30 by any suitable method, such as spot welding. The central axis of the hinge strap 114 is disposed parallel to the edge 46 of the visor 27 when the clip 30 is attached to the visor. The hinge strap 116 is similarly connected with the clip 32.

The hinge strap 116 is so disposed that its central axis is coaxial with hinge strap 114 when the clips 30 and 32 are connected with the visor 27. This enables the shield 24 to be folded between the position shown in FIG. 2 and the position shown in FIG. 3. Thus the driver may move the shield 24 between an inactive or storage position in which the shield coincides with the visor 27 as shown in FIGS. 3 and 4 and an active position shown in FIGS. 1 and 2 where the shield is effective to block glare directed toward the driver's eyes from the front of the automobile.

The hinge strap 112 is connected with the guide member 76 of the clip 30 to enable the shield 22 to fold about the central axis of the hinge between the position shown in FIGS. 2 and 3 and the position shown in FIG. 4. The hinge strap 112 is connected with the guide 76 of the clip 30 at a location between major edges of the sun visor 27 by any suitable means, such as spot welding. The hinge strap 112 is disposed with its central axis parallel to and to the left of (as viewed in FIGS. 2 and 5) the left side 80 of the clip 30. This enables the shield 22 to be folded about an axis which is perpendicular to and between the major edges 45 and 46 of the visor 27.

Thus the rectangular lefthand shield 22 is pivotable between two positions. In the first or inactive position (FIG. 4) the shield 22 lies flat against the visor 27. When the shield 22 is in the active position (FIGS. 1-3), the shield is effective to block light directed toward the driver's eyes from his left, especially light reflected from the outside rearview mirror 34.

The hinge strap 118 is similarly connected to the right-side clip 32 at a location between major edges of the sun visor 27. The right-side shield 26 (FIG. 1) is also rectangular. Its width is the same as that of left-side shield 22, but the right-side shield 26 is not as long as the left-side shield because it need only reach to block glare from the inside rearview mirror 36.

The right-side shield 26 is adapted to pivot between two positions. In the first or inactive position (FIG. 4) the shield 26 is stored in a location coincident with the visor 27. In the active position (FIGS. 1-3) the shield 26 is effective to block the glare from the lights of following automobiles which is reflected from the inside rearview mirror 36.

When the glare shield assembly 20 is not in use, each of the shields 22, 24, and 26 may be folded to an inactive position coincident with the visor 27 (FIG. 5). When glare may be a problem, the relatively long lefthand shield 22 may be folded to an active position where it blocks light from the driver's left, particularly glare reflected from the outside rearview mirror 34 (FIG. 2). The center shield 24 may be folded down to an active position to block the glare of light coming from the sun or oncoming traffic. The relatively short right-hand shield 26 may be folded to an active position where it is effective to block glare reflected from the inside rearview mirror 36.

The present invention provides a new and improved glare shield assembly 20 (FIGS. 1 and 2) which is capable of reducing glare whether the glare is produced by sunlight or by oncoming or following automobiles. A first shield 24 folds down to a position below the sun visor 27 to which it is attached. In this position it will block glare of sun or headlights shining through the windshield. A second shield 22 is hinged from the left side of the drivers sun visor 27. When it is folded out, it blocks glare coming in from the driver's side window and particularly light reflected from an outside rear view mirror 34. A third shield 26 is hinged from the right side of the driver's sun visor 27. When it is folded out, it blocks glare which would otherwise be reflected from the inside rearview mirror 36 into the driver's eyes.

The invention includes a pair of clamps 30 and 32 for holding the shields 22, 24, and 26 to the sun visor 27. Each clamp includes hinge straps 112, 114, 116, and 118 for gripping the hinge pins 102, 104, 106, and 108 connected to the side shields 22 and 26 and lower shield 24.

The clamps 30 and 32 are substantially the same (FIGS. 6 and 7). The clamp 30 is composed of a pair of hooks 40 and 42 which engage opposite edges 44 and 45 of the visor 27. An elastic strap 48 pulls the hooks 40 and 42 toward each other and into tight engagement with the edges 45 and 46 of the visor 27. A guide member 76 keeps the two hooks 40 and 42 in alignment with one another.

The hook 40 is provided with a plurality of parallel slots 60, 62, and 64 interconnected by a slot 66. The elastic strap 48 may be moved between the slots 60, 62, and 64 to engage the hook at different distances from its curved end portion 43. This arrangement enables the clamp 30 to accommodate visors 27 of different widths.

Having described a specific preferred embodiment of the invention, the following is claimed:

1. A glare shield assembly for attachment to a motor vehicle sun visor which is pivotally mounted for rotation about a generally horizontal axis proximate a major edge of the visor, the visor having first and second major edges which are connected by first and second minor edges, said glare shield assembly comprising first and second longitudinally extending clip means for engaging the major edges of the visor to connect said glare shield assembly with the sun visor, first, second, and third glare shield means for reducing the glare of light directed toward the eyes of the driver of the motor vehicle, and first, second, and third hinge means for pivotally connecting said first, second, and third glare shield means with said clip means, said first glare shield means being formed of a generally rectangular sheet of semi-transparent plastic material and connected with said first hinge means to be rotatable about a first axis which extends parallel to and is disposed proximate a major edge of the visor, said first glare shield means being pivotable about the first axis through an arc between an inactive position in which said first glare shield means is disposed in juxtaposition with the visor and an active position in which said first shield means is pivotally displaced from the visor and is effective to intercept glare directed toward the eyes of the driver from the front of the motor vehicle, said second glare shield means being formed of a generally rectangular sheet of semi-transparent plastic material and being connected with said first clip means at a location between the major edges of the visor by said second hinge means to be rotatable about a second axis which extends transverse to a major edge of the visor, said second glare shield means being pivotable through an arc between an inactive position in which said second glare shield means is disposed in juxtaposition with the visor and an active position in which said second shield means is pivotally displaced from the visor and is effective to intercept glare directed toward the eyes of the driver of the motor vehicle from the left side of the motor vehicle, said third glare shield means being connected with said second clip means at a location between the major edges of the visor by said third hinge means to be rotatable about a third axis which extends transverse to a major edge of the visor, said third shield means being pivotable through an arc between an inactive position in which said third glare shield means is disposed in juxtaposition with the visor and an active position in which said third glare shield means is pivotally displaced from the visor and is effective to intercept glare directed toward the eyes of the driver of the motor vehicle from the right side of the motor vehicle, said second axis being disposed proximate one of the minor edges of the visor and said third axis being generally parallel to and spaced apart from said second axis.

2. A glare shield assembly as set forth in claim 1 wherein said first hinge means includes a pair of hinge members having a passage through each, one of said pair of hinge members being fixedly connected with said first clip means proximate one end portion of said first clip means, and the other one of said pair of hinge members being fixedly connected with said second clip means proximate one end portion of said second clip means, said passages through said hinge means being disposed in coaxial alignment, said first hinge means further including a pair of pins adapted to be received in said passages in said hinges and fixedly connected with said first shield means proximate a major edge of said first shield means, each one of said pair of pins extending outwardly from opposite minor edges of said first shield means.

3. A glare shield assembly as set forth in claim 1 wherein said second rectangular glare shield means has major and minor edges, and wherein said third shield means is formed of a generally rectangular sheet of semi-transparent plastic material having minor edges the same length as said minor edges of said second shield and having major edges which are shorter than said major edges of said second shield.

4. A glare shield assembly as set forth in claim 1 wherein said first and second clip means includes first and second opposed hooks each having a straight body portion and a curved end portion adapted to engage a major edge of the visor, a continous elastic strap for drawing said hooks into clamping relation with opposite major edges of the visor, and adjustment means for enabling said clip means to be drawn into clamping relation with the opposite major edges of the visor regardless of the distance between the edges, said adjustment means comprising a slot means in said body portion of said first hook for engaging said elastic strap and a plurality of slot means in said body portion of said second hook for selectively engaging said strap, said plurality of slot means being parallel and each of said plurality of slot means being spaced a different distance from said curved end portion of said second hook, said strap being engageable by any one of said plurality of slot means to adjust the distance between said curved end portions of said hooks.

5. An apparatus as set forth in claim 1 wherein each of said hinge means includes means for producing variable friction between said glare shield means and said clips to hold said glare shield means in preadjusted positions relative to said clips.

6. A glare shield assembly for attachment to the visor of an automobile, said glare shield assembly comprising a shield means formed of semi-transparent plastic for reducing the glare of sunlight or headlights, and clip means for connecting said glare shield assembly with the visor, said clip means including first and second opposed hooks each having a straight body portion and a curved end portion adapted to engage a major edge of the visor, a continuous flat elastic strap for drawing said hooks into clamping relation with opposite top and bottom edges of the visor, and adjustment means for enabling said clip means to be drawn into clamping relation with the opposite major edges of the visor regardless of the distance between the edges, said adjustment means comprising slot means in said body portion of said first hook for engaging said elastic strap and a plurality of slot means in said body portion of said second hook for selectively engaging said strap, each of said plurality of slot means being spaced a different distance from said curved end portion of said second hook, said strap being engageable by any one of said plurality of slot means to adjust the distance between said curved end portions of said hooks.

7. A glare shield assembly as set forth in claim 6 wherein said clip means include hinge means for enabling said shield means to pivot about an axis parallel to the major edges of the visor.

8. A glare shield assembly as set forth in claim 6 further including hinge means for enabling said shield means to pivot about an axis perpendicular to the major edges of the visor.

9. A glare shield assembly for attachment to a motor vehicle sun visor which is pivotally mounted for rotation about an axis adjacent to a first major edge portion of the sun visor, said glare shield assembly comprising a first clip assembly adapted to engage the first major edge portion and a second major edge portion of the sun visor adjacent to a first minor edge portion of the sun visor and which extends between the major edge portions of the sun visor, a second clip assembly adapted to engage the first and second major edge portions of the sun visor adjacent to a second minor edge portion of the sun visor and which extends between the first and second major edge portions of the sun visor, first semi-transparent glare shield means for reducing the extent of exposure of a driver of the vehicle to glare, first hinge means for pivotally connecting said first semi-transparent glare shield means with said first and second clip assemblies for pivotal movement about an axis disposed adjacent to the second major edge portion of the sun visor, second semi-transparent glare shield means for reducing the extent of exposure of the driver of the vehicle to glare, second hinge means for pivotally connecting said second glare shield means to said first clip assembly at a location intermediate the first and second major edge portions of the sun visor, third semi-transparent glare shield means for reducing the extent of exposure of the driver of the vehicle to glare, and third hinge means for pivotally connecting said third glare shield means to said second clip assembly at a location intermediate the first and second major edge portions of the sun visor, said first, second and third glare shield means being independently movable relative to each other and the sun visor to enable their relative positions to be independently adjusted to compensate for variations in the extent and direction of glare to which the driver of the vehicle is exposed.

10. A glare shield assembly for attachment to the visor of an automobile, said glare shield assembly comprising a shield means formed of semi-transparent plastic for reducing the glare of sunlight or headlights, and clip means for connecting said glare shield assembly with the visor, said clip means including first and second opposed hooks each having a straight body portion and a curved end portion adapted to engage a major edge of the visor, a continuous elastic strap for drawing said hooks into clamping relation with opposite top and bottom edges of the visor, and adjustment means for enabling said clip means to be drawn into clamping relation with the opposite major edges of the visor regardless of the distance between the edges, said adjustment means comprising slot means in said body portion of said first hook for engaging said elastic strap and a plurality of slot means in said body portion of said second hook for selectively engaging said strap, each of said plurality of slot means being spaced a different distance for said curved end portion of said second hook, said strap being engageable by any one of said plurality of slot means to adjust the distance between said curved end portions of said hooks, said shield means including first, second, and third shield means, said first and second shield means being pivotally connected with said clips to pivot about an axis perpendicular to the major edges of the visor and said third shield means being pivotally connected with said clips to pivot about an axis parallel to the major edges of the visor.

11. An apparatus as set forth in claim 10 further including hinge means for securing the connection between said shield means and said clip means, said hinge means including means for producing variable friction between said shield means and said clips to hold said shield means in preadjusted positions relative to said clips.

12. A glare shield assembly for attachment to the visor of an automobile, said glare shield assembly comprising shield means formed of semi-transparent material for reducing the glare of sunlight or headlights, and clip means for connecting said shield assembly with the visor, said clip means including first and second opposed hooks each having a straight body portion and a curved end portion adapted to engage an edge of the visor, elastic strap means for pressing said curved end portion of one of said hooks against a top edge of the visor and for pressing said curved end portion of the other one of said hooks against the bottom edge of the visor, adjustment means for enabling said clip means to engage the top and bottom edges of the visor regardless of the distance between the edges, said adjustment means comprising slot means in said body portion of said first hook for engaging said elastic strap and a plurality of slot means in said body portion of said second hook for selectively engaging said strap, each of said plurality of slot means being spaced a different distance from said curved end portion of said second hook, said strap being engageable by any one of said plurality of slot means to adjust the distance between said curved end portions of said hooks, and retainer means for holding said straight body portions of said first and second hooks in alignment with each other.

13. A glare shield assembly as set forth in claim 12 wherein said retainer means includes a retainer member which extends between said straight body portions of said first and second hooks, said clip member having surface means for engaging opposite sides of said straight body portions of said first and second hooks to hold said hooks against sidewise movement relative to each other.

14. A glare shield assembly as set forth in claim 13 further including hinge means for pivotally connecting said shield means with one of said hooks.

* * * * *